United States Patent [19]
Koga et al.

[11] Patent Number: 5,295,032
[45] Date of Patent: Mar. 15, 1994

[54] ROTARY MAGNETIC HEAD DEVICE

[75] Inventors: Hirohisa Koga; Kenji Kobayashi; Takayuki Kurahara, all of Kanagawa, Japan

[73] Assignee: Sony Corporation, Tokyo, Japan

[21] Appl. No.: 855,094

[22] Filed: Mar. 20, 1992

[30] Foreign Application Priority Data

Mar. 20, 1991 [JP] Japan ................................. 3-056868

[51] Int. Cl.⁵ ........................... G11B 5/53; G11B 21/18
[52] U.S. Cl. ...................................... 360/107; 360/104
[58] Field of Search ................. 360/107, 121, 104, 21

[56] References Cited

U.S. PATENT DOCUMENTS

| | | | |
|---|---|---|---|
| 3,401,236 | 9/1968 | Narma et al. | 360/107 |
| 4,184,183 | 1/1980 | Dolby | 360/107 |
| 4,318,146 | 3/1982 | Ike et al. | 360/107 |
| 4,860,132 | 8/1989 | Lorteije | 360/84 |
| 5,038,241 | 8/1991 | Ohuchi | 360/107 |
| 5,130,875 | 7/1992 | Ono et al. | 360/107 |

FOREIGN PATENT DOCUMENTS 2904716 2/1979 Fed. Rep. of Germany ...... 360/104

*Primary Examiner*—Robert S. Tupper
*Assistant Examiner*—Kevin M. Watkins
*Attorney, Agent, or Firm*—Hill, Steadman & Simpson

[57] ABSTRACT

A plurality of head tips Ra to Rd' and Pa to Pd' are disposed adjacently to each other in such a manner as to project from a peripheral surface of a rotary drum 2 by a predetermined length and at the same time the projecting lengths of the head tips Ra to Pd' are selected in such a way so that the surface pressures of a plurality of head tips Ra to Pd' on the magnetic tape 9 become uniform. Outer head tips are inclined by a predetermined angle and fixed. With such an arrangement, since the gap positions of the head tips become the center of tape contact against the magnetic tape 9, the surface pressures of the magnetic tape 9 against the head tips become substantially constant. If the surface pressures become constant, the head tips uniformly wear.

1 Claim, 5 Drawing Sheets

ROTARY MAGNETIC HEAD DEVICE

BACKGROUND OF THE INVENTION

1. Field of the Invention

This invention relates to a rotary magnetic head device which is preferably applied to a digital VTR having several rotary magnetic heads (head tips) mounted thereon or the like.

2. Description of the Prior Art

It is well known in the prior art of the digital VTR that as the number of revolutions of the rotary drum is increased to perform a recording/reproducing operation or the number of recording/reproducing heads is increased to process the data in parallel to perform recording/reproducing operation so as to process a large amount of data. In case of a digital VTR in which high definition signals for use in reproducing high definition images are recorded or reproduced, a certain type of digital VTR employs the latter process.

In this type of digital VTR, the data rate to be recorded or reproduced reaches about 1 Gbps, so that eight magnetic heads are used as the rotary magnetic head device for recording/reproducing operation. FIG. 4 illustrates one example of an arrangement of the magnetic heads. In the case that the magnetic heads constructed of a plurality of head tips are fixed onto the rotary drum 2 (actually the rotary plate disposed between the upper and lower divided drums), that the plurality of head tips are equally spaced apart on the rotary drum 2 and disposed on it. However, this arrangement may cause a problem of a crosstalk of signals, so that as shown in FIG. 4, the magnetic heads are concentrically fixed at a part of the drum.

In FIG. 4, reference numerals 3 and 4 denote recording heads in which four head tips (Ra, Rb, Rc, Rd) and (Ra', Rb', Rc', Rd') are disposed adjacent to each other, respectively, and each of the heads may act as an independent recording head. The recording heads 3 and 4 are angularly spaced apart by about 180°. Reference numerals 5 and 6 denote reproducing heads in which each of four head tips (Pa, Pb, Pc, Pd), (Pa', Pb', Pc', Pd') is disposed adjacent to each other in the same manner as that of the recording heads 3 and 4 and each of the heads any act as an independent reproducing head. As shown in the figure, the reproducing heads 5 and 6 are angularly disposed by about 180° at a position shifted by 90° from each of the recording heads 3 and 4.

Four head tips constituting the recording heads 3, 4 and the reproducing heads 5, 6 are formed as small as possible and an inter-head tip distance is made as small as possible to cause the four head tips to be mounted on the same head base (not shown). As described above, an entire mass and a shape of the head base are formed small to facilitate a manufacturing of the head and additionally it has an effect that a centrifugal force acting against the head base can be reduced during its use.

Each of the head tips (Ra, Rb, Rc, Rd), (Ra', Rb', Rc', Rd') and (Pa, Pb, Pc, Pd), (Pa', Pb', Pc', Pd') is fixed so as to be in parallel to each other and at the same time as shown in the figure, they are disposed to show the same length (a projecting amount).

As described above, when the magnetic head tips are used while they are disposed in parallel to each other and have the same projecting length (a projecting amount), the recording heads 3, 4 and the reproducing heads 5, 6 gradually wear. Since this wearing phenomenon is equally found in all the heads, only the recording head 3 will be studied. In this case, the four head tips do not uniformly wear, but the outer two head tips Ra and Rd wear more than the inner two head tips Rb and Rc. This is due to the fact that the outer head tips Ra and Rd have a higher surface pressure (a tape contact pressure) than that of the inner head tips Rb and Rc.

In addition, the outer head tips have a larger tape noise than that of the inner head tips and further it has been confirmed that the tape noise deteriorates as a ratio of S/N.

SUMMARY OF THE INVENTION

It is an object of the present invention to provide a rotary magnetic head device in which a plurality of head tips are disposed adjacent to each other and the surface contact pressure of each of the head tips is made uniform.

According to one aspect of the present invention there is provided a rotary magnetic head device in which a plurality of magnetic heads each having a equal radius of curvature in a plane including the gas opposite to a magnetic tape which are disposed adjacent at predetermined positions on a rotary body, and each of the magnetic heads is disposed so as to project out from a peripheral surface of the rotary body by a predetermined amount and an information signal is recorded and/or reproduced by the magnetic heads on the magnetic tape running on the peripheral surface of the rotary body, wherein each of the magnetic heads is disposed such that the projecting distance and the angles of the magnetic heads opposing the magnetic tape are selected in such a way that they point to the center of a plane of each of the magnetic heads opposing the magnetic tape, that is, a tape opposing surface coincides substantially with the center of the gaps of the magnetic heads.

According to another aspect of the present invention there is provided a rotary magnetic head device in which a plurality of magnetic heads each having equal radius in curvatures of a plane including the gaps opposite to a magnetic tape are disposed adjacent to each other at predetermined positions on a rotary body, and each of the magnetic heads is disposed so as to project out of a peripheral surface of the rotary body by a predetermined distance and an information signal is recorded and/or reproduced by the magnetic heads on the magnetic tape running on the peripheral surface of the rotary body, wherein each of the magnetic heads is inclined from each other in such a way that a surface of each of the magnetic heads against the magnetic tape goes along the magnetic tape, and the forward-most magnetic head and the rearmost magnetic head in the advancing direction of the the magnetic heads are inclined such that the distance from the gaps of such magnetic heads to a point formed by crossing lines which are at right angles to tangential lines of such magnetic heads at the gaps is smaller than the radius of the rotary body.

DESCRIPTION OF THE PREFERRED EMBODIMENTS

Figure 1:
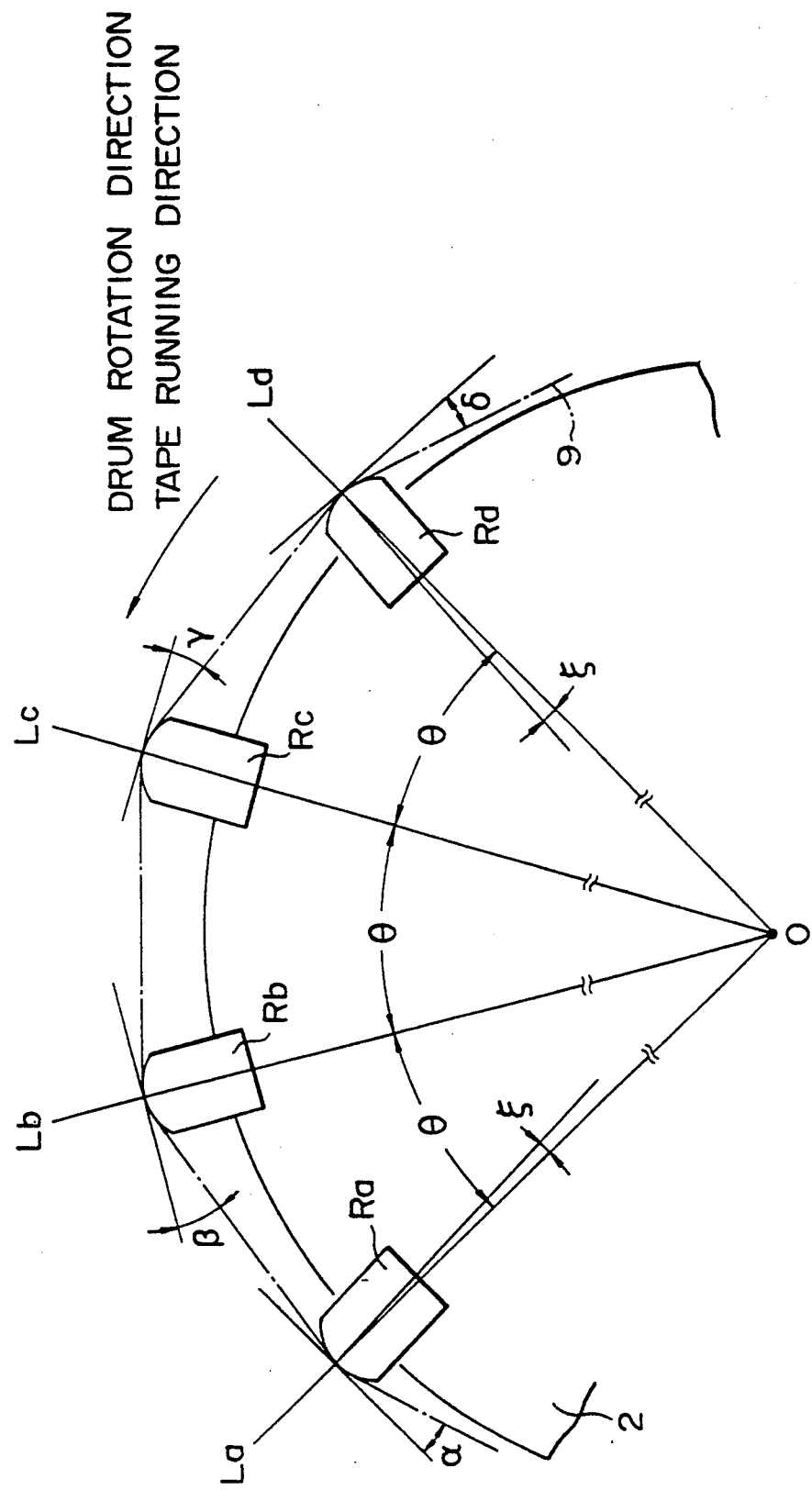
FIG. 1 is a view of configuration for showing a substantial part of one example of a rotary magnetic head device of the present invention.

Referring now to the drawings, preferred embodiments of the present invention applied to a digital VTR used when a high definition signal is recorded and reproduced by one example of the rotary magnetic head device will be described in detail.

Figure 4:
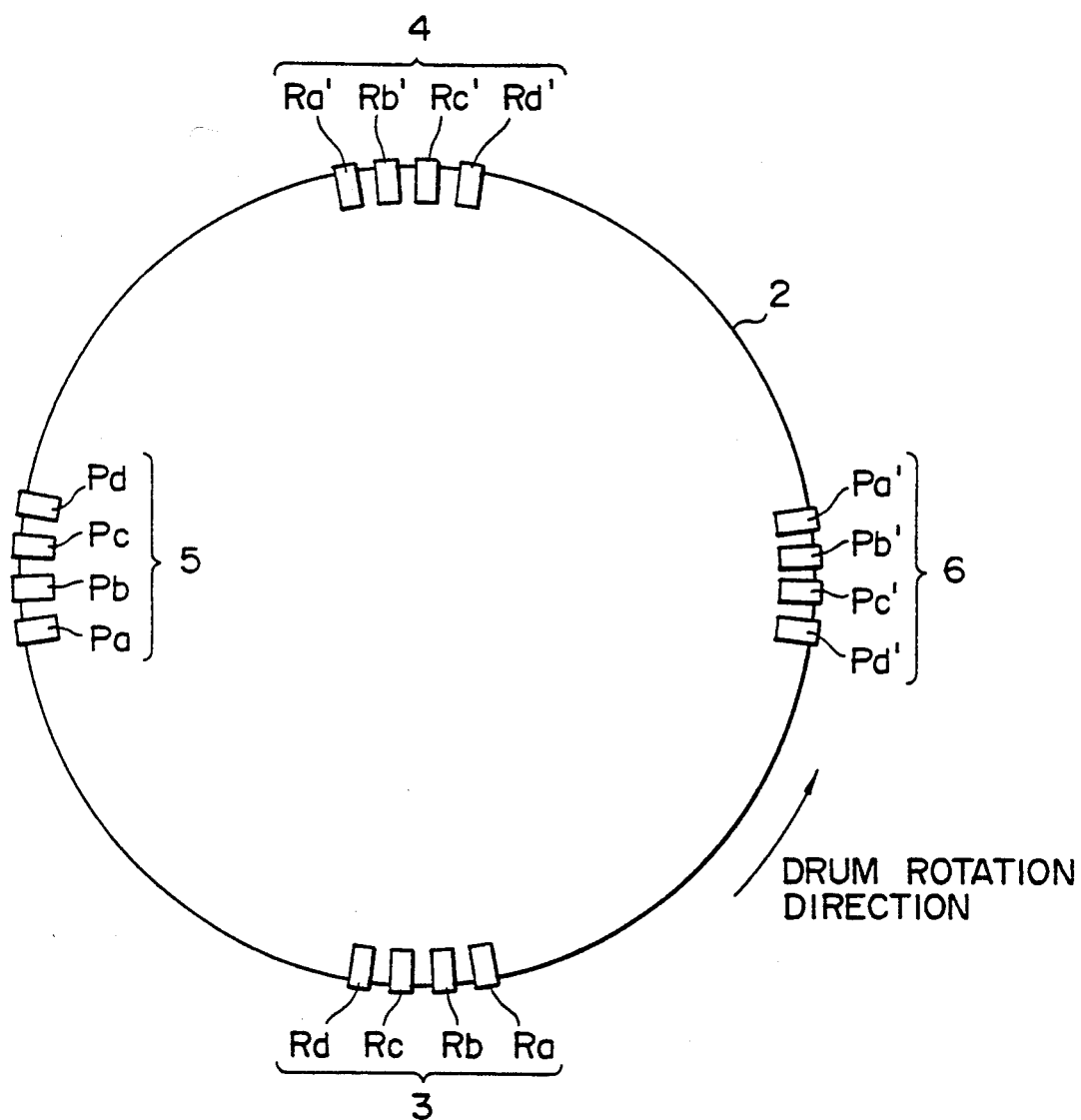
FIG. 4 is a schematic view for showing a substantial part of one example of a convential rotary magnetic head device to which a plurality of heads are fixed.

In case of the digital VTR as described above, the head configuration of the rotary magnetic head device is constructed by eight heads for recording and reproducing as shown in FIG. 4. Since the recording heads 3, 4 and reproducing heads 5, 6 disposed adjacent to each other in a unit of four heads are constructed in the same manner description, only the configuration of the recording head 3 will be described and the remaining heads are not described since they are the same.

FIG. 1 shows one example of a fixed state of four head tips disposed on a head base (not shown). Solid lines La, Lb., Lc and Ld contact a gap of each of the head gaps and extend to a rotary center O of the rotary drum 2. The gaps of each of the head tips Ra, Rb, Rc and Rd are disposed on these lines La, Lb, Lc and Ld. Angles formed by the lines La, Lb, Lc and Ld are defined by $\theta$ and are equal to each other and are set to about 3°. The four head tips Ra, Rb, Rc and Rd are disposed in such a manner as to project out of a circumferential surface of the rotary drum 2 by predetermined lengths. The inner head tips Rb and Rc are projected more outwardly than the outer Rb and Rc project further out than the outer.

Figure 5:
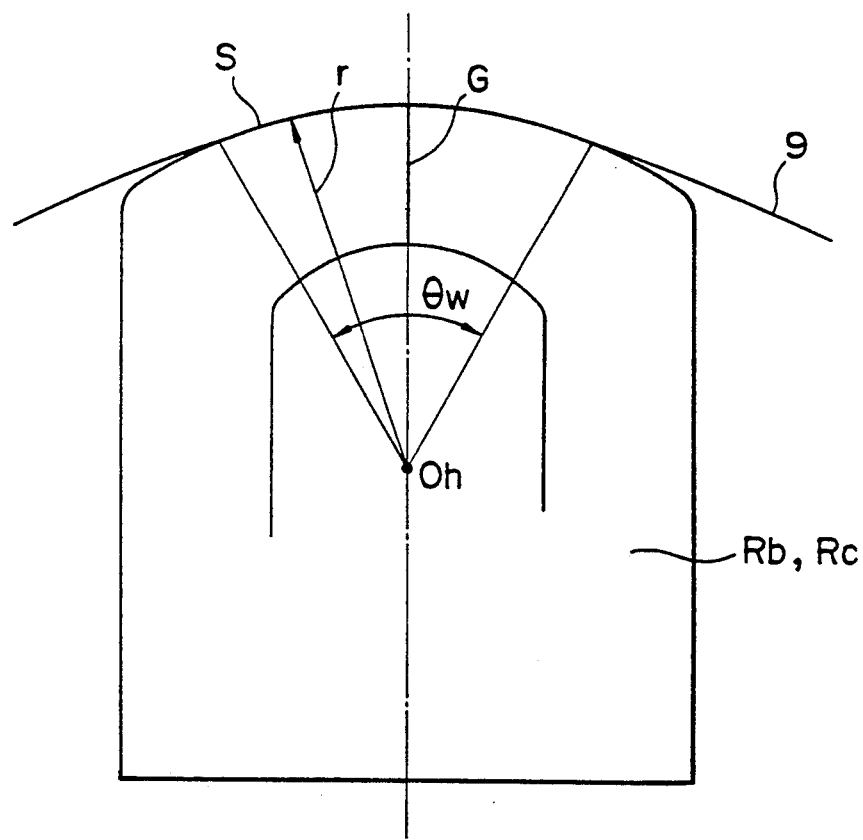
FIG. 5 shows each of the head tips Rb and Rc of a rotary magnetic head according to the present invention.

For example, in the event that the projecting distance of the inner head tips Rb and Rc is 50 $\mu$m and a superior tape contact state is attained with this projecting distance, the projecting distances of the outer head tips Ra and Rd are selected to be reduced by about 10 $\mu$m less than the inner heads and then the head tips are fixed. The winding angles of the magnetic tape 9 around the peripheral, surface of each of the head tips Ra, Rb, Rc and Rd with the setting of the above projecting distances become equal to each other. At this time, in case of the head tips Rb and Rc, they are placed at the contact center of the magnetic tape 9, i.e., the center of the contact surface of the magnetic tape 9. This state is shown in FIG. 5. Referrence Oh denotes a center of curvature of a peripheral surface of the head tip, $\theta$w denotes a tape winding angle and S denotes a tape contact surface.

Figure 6:
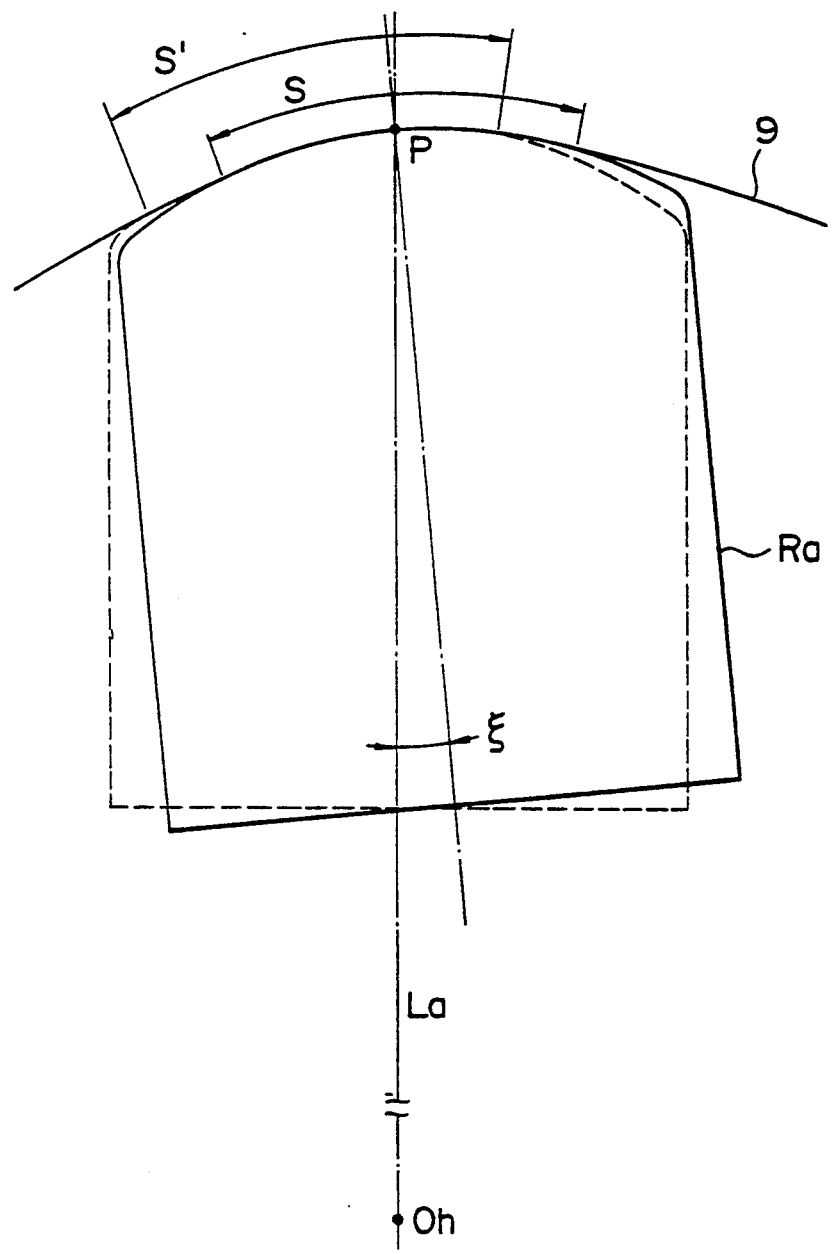
FIG. 6 shows an example of the head tip Ra of a rotary magnetic head according to the present invention.

In addition, the outer head tips Ra and Rd, as shown in FIG. 1, are fixed so as to be inclined by a predetermined angle $\xi$ relative to their center lines. With such an arrangement, the outer head tips Ra and Rd are directed more outwardly than that of the inner head tips Rb and Rc. As described above, the reason why each of the outer head tips Ra and Rd is inclined fact is that the position of the gaps of each of the head tips Ra and Rd is taken as a contact center of the tape 9 in the same manner as that of the head tapes Rb and Rc as shown in FIG. 6. P indicates a central position of the gap which is located on the line La. The dotted line indicates the position of the head tip in case where the head tip is not inclined. Referrence S' denotes a tape contact surface of the head tip Ra when the head tip is not inclined. In the event that the head tip is not inclined, the position of the gap does not occupy the central part of the tape contact surface S'.

The head tip shown by a solid line has an inclination angle $\xi$ with respect to the line La. This inclination angle has its apex at the central position P of the gap. Applying this inclination angle $\xi$ causes the tape contact surface of the head tip Ra to become S and then the central position of the gap coincide with the center of the tape contact surface S, i.e., the center of contact.

In an example in which the head tip Rd is inclined, if the inclination angle $\xi$ is inclined toward the side with respect to the line Ld as viewed in FIG. 1, a similar effect to that of the head tip Ra can be attained.

If the position of the gap of each of the head tips Ra to Rd comes to a contact center of the magnetic tape 9, as shown in FIG. 1, an angles $\alpha$, $\beta$, $\gamma$ and $\delta$ between the tangential line in the gap of the head tip and the magnetic tape (the incident angle) become substantially constant. In this way, as the incident angles become substantially equal to each other, the surface pressures of the magnetic tape 9 to the head tips Ra to Rd become substantially constant. If the surface pressures become constant, the head tips Ra to Rd wear equally. The head tips Ra and Rd located at the fixing angle $\theta$ have the inclination angle $\theta$ of about 9 minutes. When the head tips Ra and Rd are inclined by the inclination angles $\xi$, the projecting distances of the head tips Ra and Rb are correspondingly varied and as the inclination angles $\xi$ are increased, the projecting distances are increased. However, actually, at the inclination angles of about 9 minutes, this increasing distance is so slight that it can be ignored.

Values of the fixing angle $\theta$, head projecting distances and inclination angle $\theta$ are selected so as to keep each of the surface pressures equal the head tips Ra to Rd on the magnetic tape 9.

Figure 2:
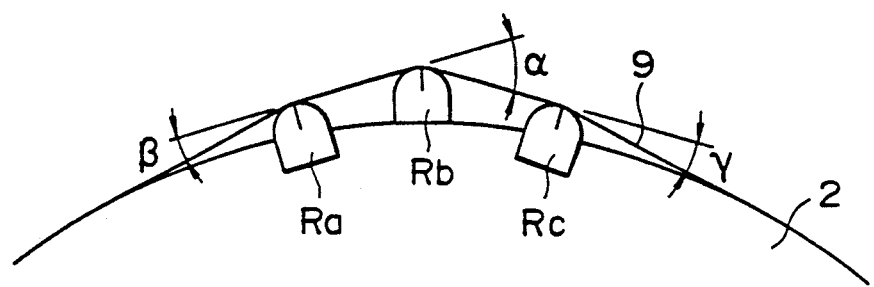
FIG. 2 is a view of configuration for showing a substantial part of another example of a rotary magnetic head device of the present invention.

FIG. 2 shows an example of a mounting condition when three head tips Ra to Rc are used. Also in this case, the winding angle of the magnetic tape 9 with respect to the head tips Ra to Rc is kept substantially constant, the gap positions of the head tapes Ra to Rc coincide with the center of the tape contact surface and the outer fixing angle (the inclination angle $\xi$) as well as the projecting distance as required is selected.

Figure 3:
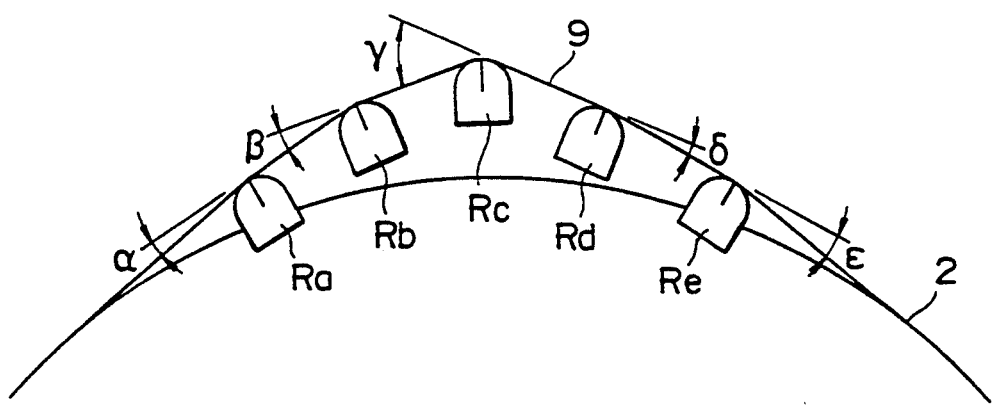
FIG. 3 is a view of configuration for showing a substantial part of a still further example of a rotary magnetic head device of the present invention.

FIG. 3 illustrates an example for mounting five head tips Ra to Re. Also in this case, each of the mounting angles (inclination angle $\xi$) for the outer and inner head tips Ra, Rb, Rd and Re as well as a projecting distances of each of the head tips are selected with respect to the head tips Ra to Re and the magnetic tape 9. As described above, the present invention, is not limited by the number of heads mounted on the rotary drum. As described above, the rotary magnetic head device of the present invention is constructed such that each of the surface contact pressures of the magnetic tape against these head tips are maintained substantially constant.

According to the present invention, since the gap positions of the head tips become the center of tape contact with respect to the magnetic tape, the surface contact pressures of the magnetic tape against the head tips are substantially constant. If the surface contact pressures are constant, the head tips will uniformly wear out. As they wear each of the output characteristics of each of the heads will remain constant.

Since the outer head tips are inclined with respect to the inner head tips by a predetermined angle, the outer head tips do not produce a larger tape noise than the inner head tips.

What is claimed is:

1. In a rotary magnetic head device comprising, a plurality of side-by-side magnetic heads which have recording gaps and said heads are each mounted on a radius of curvature in a plane and each of said plurality of heads mounted opposite to a magnetic tape at a predetermined positions on a rotary body wherein, a plurality of radial lines L respectively, extend through the center of the gap of each of said magnetic heads and each extend to the center of said rotary body and the angles between said plurality of lines L are equal so that the angular intervals between said magnetic heads are equal, and where the forward-most magnetic head and the rearward-most magnetic head relative to the advancing direction of tape are at angles $\epsilon$ relative to the respective radial line L which extends through them and wherein $\epsilon$ is not zero so that their recording gaps project outwardly, respectively, in forward and reverse directions of movement of the tape and wherein said plurality of heads includes additional magnetic heads mounted between said forward-most and rearward-most heads which are mounted so that their recording gaps are on the respective radial lines L which extend through them, and wherein said forward-most and rearward-most heads are at distances from the center of said rotary body which are equal and the additional magnetic heads between said forward-most and rearward-most heads are at distances from the center of said rotary body which are greater than the distances of said forward-most and rearward-most magnetic heads from the center of said rotary body.

* * * * *